Jan. 31, 1956
D. G. TAYLOR
2,732,720
TWO AXES STABILIZED PLATFORM
Filed April 4, 1952
2 Sheets-Sheet 1
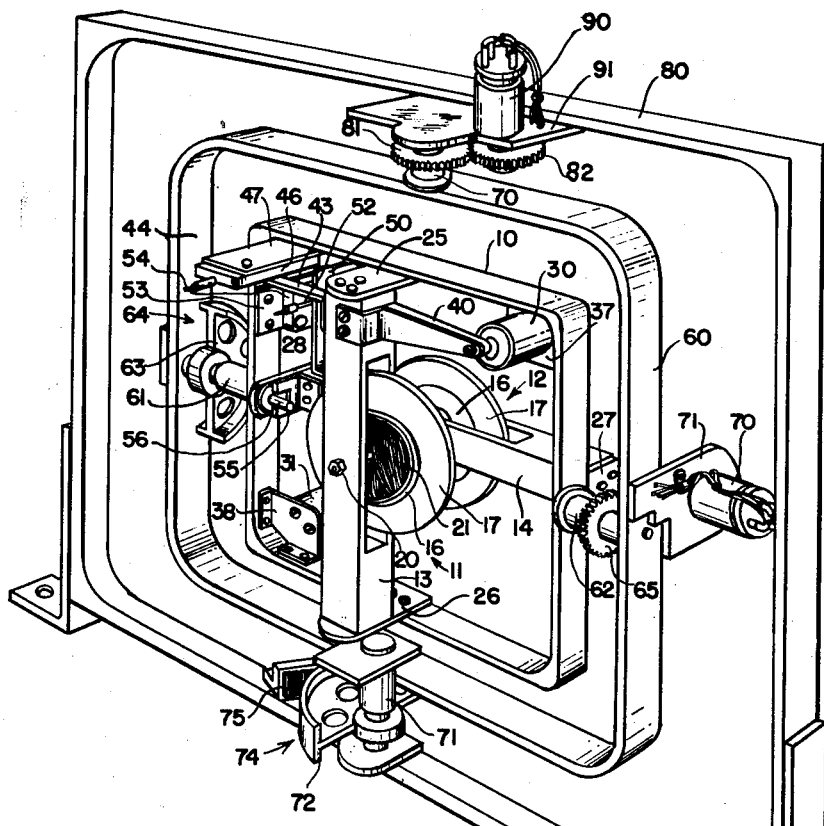
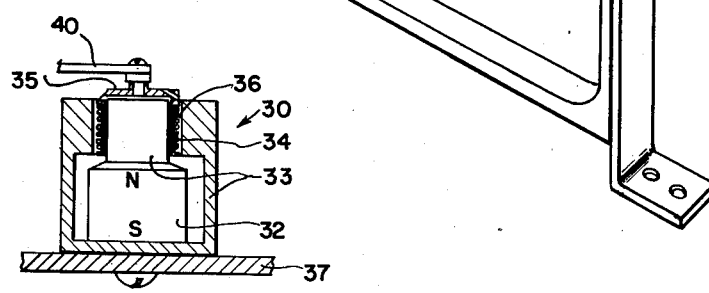
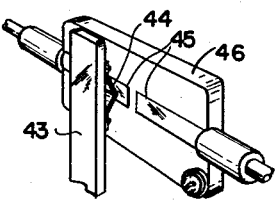
INVENTOR.
DANIEL G. TAYLOR
BY
*George H Fisher*
ATTORNEY Jan. 31, 1956  D. G. TAYLOR  2,732,720
TWO AXES STABILIZED PLATFORM
Filed April 4, 1952  2 Sheets-Sheet 2

INVENTOR.
DANIEL G. TAYLOR
BY
George H Fisher
ATTORNEY

United States Patent Office 2,732,720
Patented Jan. 31, 1956

2,732,720
TWO AXES STABILIZED PLATFORM

Daniel G. Taylor, Minneapolis, Minn., assignor to Minneapolis-Honeywell Regulator Company, Minneapolis, Minn., a corporation of Delaware Application April 4, 1952, Serial No. 280,480

14 Claims. (Cl. 74—5.34)

My invention relates to gyroscopes and more particularly to an improved two axes stabilized platform utilizing a pair of gyroscopes for the stabilization of the platform.

Stabilizing devices or platforms having two displacement axes are well known in the art of gyroscopes, but these devices in the past have not been able to provide a stable reference over a wide range of displacement about a pair of displacement axes while at the same time providing a platform capable of being precessed at known and widely variable rates of precession over this range of displacement for certain types of control operation.

In the present invention a platform is stabilized through the gyroscopic rigidity of a pair of single axis displacement type gyroscopes mounted on the platform with their displacement axes normal to one another. A gimbal structure pivotally mounts the platform about a pair of mutually perpendicular displacement axes, the gimbal structure also including signal generating means for providing signals in proportion to displacement of said platform about said pair of mutually perpendicular displacement axes of the gimbal structure. When the object upon which the platform is mounted through the gimbal structure is moved relative to the platform, the signal generators provide signals in proportion to this displacement for various control functions. Similarly, precessive movement of the platform, as will be later described, relative to the structure upon which the platform is mounted will be sensed. Means are also included on the platform and the gimbal structure to maintain a predetermined relationship between the gyroscopes and the platform to overcome frictional errors, etc. in the gyroscopes and their mountings. Torquers, mounted on the platform and cooperating with the gyroscopes, apply variable torques to said gyroscopes about their displacement axes to cause precession of the platform about the displacement axes of the gimbal structure at rates proportional to the torque input, thereby giving additional control signals for controlling purposes.

It will therefore be seen that it is an object of this invention to provide an improved two axes stabilized platform.

It is also an object of this invention to provide a two axes stabilized platform from which rate and displacement output signals can be obtained.

It is further an object of this invention to provide in a two axes stabilized platform an arrangement which permits wide angle displacements of the platform but provides for limited displacements of the gyroscopes with respect to the platform through which precessive torques are applied to give a wide and accurate control over precession rates of the platform.

Another object of this invention is to provide in a two axes stabilized platform an arrangement in which a pair of gyroscopes are used to directly stabilize said platform about a pair of mutually perpendicular displacement axes and cause precession of the platform at accurately calibrated rates without interference with the operation of one or the other of the gyroscopes.

These and other objects of this invention will become apparent from a reading of the attached description together with the drawings wherein:

Figure 1 is a view of the improved two axes stabilized platform in perspective,

Figure 2 is a sectional view of a torquer of the platform,

Figure 3 is a view in perspective of one of the switching apparatus which controls operation of one or the other of a pair of precession motors to maintain the predetermined relationship between the gyroscopes and the platform.

Figure 4:
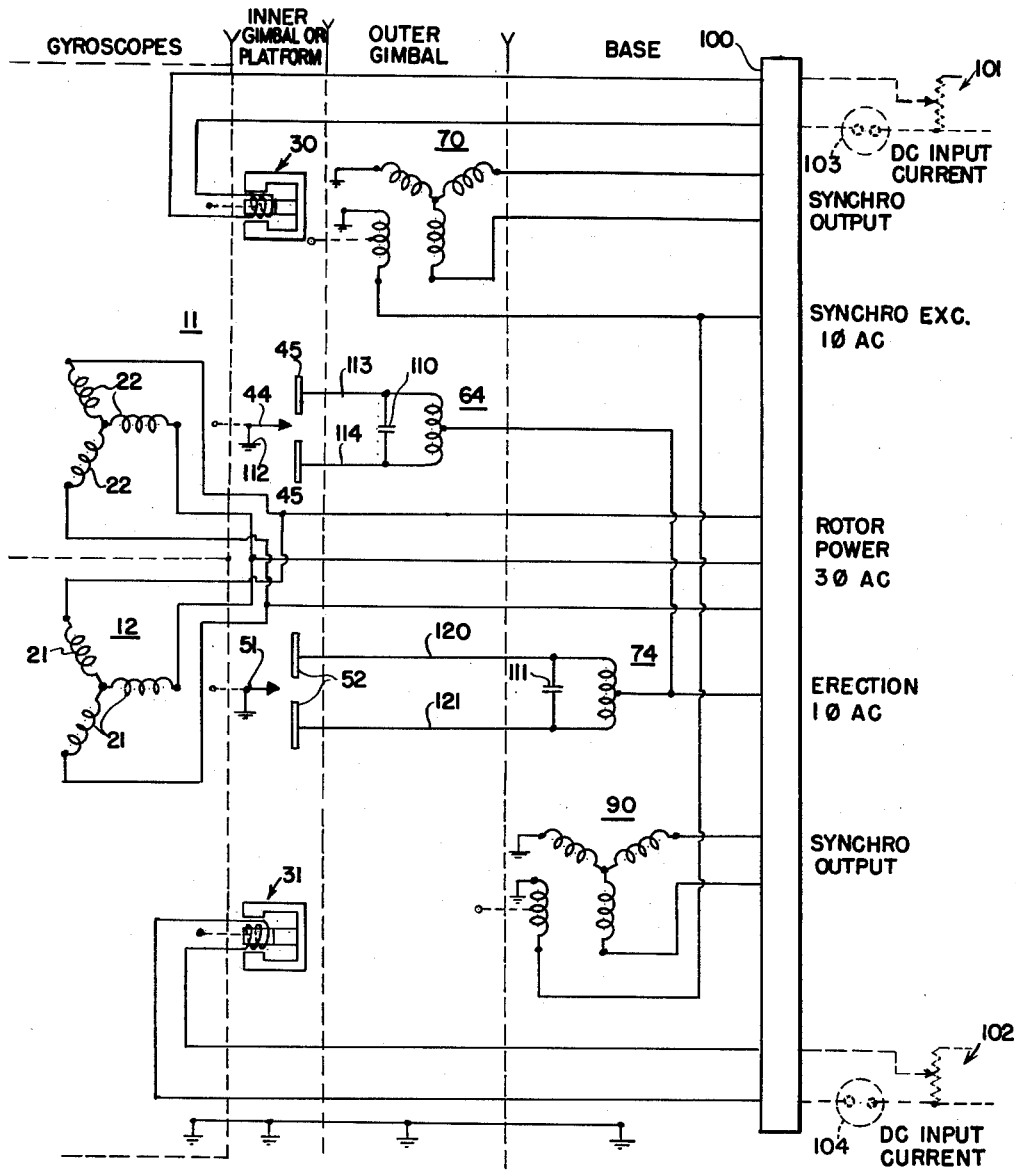
Figure 4 is a schematic circuit of the electric components of our improved stabilized platform.

As shown in Figure 1, my two axes stabilized platform comprises an inner gimbal or platform indicated at 10 upon which a pair of gyroscopes 11 and 12 are pivotally mounted through a pair of rotor support members 13, 14 or, sensitive gimbals in such a manner that the pivot axes of the support members 13 and 14 are normal to one another on the platform 10. Gyroscopes 11 and 12 are identical in shape, and each comprises a rotor element 16 cup shaped in form having an annular flange portion 17 or mass suitably attached as is conventional in gyro art. Each rotor is pivoted on a support or shaft indicated at 20 and is journalled on the shaft with suitable bearing means not shown. Also mounted on the shaft and positioned within the cup shaped portion of the rotor is the field element 21 of each gyroscope, the field element being a three phase device having a plurality of poles (not shown) thereon which cooperates with a hysteresis ring (not shown) mounted in the rotor to make up the driving means for the rotor mass. The field elements are stationarily mounted on the shafts 20, each shaft being supported on its respective sensitive gimbal or rotor support member 13, 14 which are shown herein as generally bar shaped in form with an aperture therein within which the rotor wheel is mounted. However, the support member may take any desired form as long as it supports the field element and pivots a rotor member. The rotor support member or sensitive gimbal 13 is journalled through suitable means (not shown) on flanges 25, 26 of platform 10, this pivot structure defining a single displacement axis for the gyroscope 11 normal to the spin axis of the gyroscope as defined by the shaft 20. Similarly rotor support 14 is pivoted through suitable pivot structures, also not shown, on flanges 27, 28 to define a displacement axis for the gyroscope 12, this displacement axis being normal to the displacement axis as defined by the pivots of support member 13. It will be understood that each of the gyroscopes 11 and 12 and their associated support means 13 and 14 are identical in size and mass and are equally displaced from the center of gravity of the platform 10 such that the center of gravity of the composite structure will be coincident with the center of gravity of the platform. Also included with each of the gyroscopes 11 and 12 are a pair of identical torquer members 30, 31. The details of the torquer members are shown in Figure 2 where it will be seen that the torquer 30 is comprised of a permanent magnet 32 positioned in a homopolar type core structure 33 having a central portion of one magnetic polarity and an annular rim portion of an opposite magnetic polarity with an annular air gap 36 therein in which is positioned a coil 34 mounted on a suitable bobbin 35. This torquer is a direct current energized device of limited displacement and well known operating characteristics in which a definite linearity exists between energizing current and torque output over its relatively short range of displacement. The torquer 31 is identical to a torquer 30, each device being mounted on a flange portion 37, 38 respectively with platform 10. The coil or movable portion of the torquer 30 is connected through an operating arm 40 to support member 13. Similarly the operating coil of torquer 31, not shown, is connected through a similar arm, not shown, to the support member 14 of gyroscope 12 such that it will in the same manner as torquer 30 apply a torque to the support member connected therewith in proportion to the energization of the coil. Also mounted on the rotor support member or sensitive gimbal 13 is a switch arm 43 which mounts a wiper 44 cooperating with a pair of stationary contact members 45 imbedded in an insulating support 46 (see Figure 3). The stationary portion of the switch comprising support 46 with contact members 45 thereon is mounted on a flange 47 attached to platform 10 and the arm 43 with wiper 44 thereon cooperates with the stationary contacts in such a manner that relative displacement of the support member 13 with the platform 10 will cause the movable wiper 44 to engage one or the other of the contact members 45, for purposes which will be later noted. Similarly support member 14 has switch arm 50 with a wiper 51 (not shown in Figure 1) mounted thereon cooperating with a contact structure 52 on a support 54 identical to that shown in Figure 3 mounted on a flange 53 of platform 10. The displacement of support member 14 relative to platform 10 is sensed by the switching mechanism formed by the wiper 51 cooperating with the stationary contact structure or contacts 52 on flange 53. It will also be seen that displacement of the support member 14 relative to the platform 10 through the pivots of the flanges 27, 28 and the support member 14 is limited by means of a stop member indicated at 55 in the form of a U-shaped bracket member cooperating with a post 56 attached to the platform 10. A similar stop arrangement is included with the flange 25 and rotor support 13 but these are not in view in Figure 1. This limited displacement of the gyroscopes 11, 12 relative to the platform 10 is provided such that the rotor support members 13, 14 and consequently the mounting arms of the torquers 30, 31 would stay within the limited displacement limits of the torquers which are extremely accurate and linear over the relatively short allowed travel of operation of the device.

It will be noted that the wiring and circuity to the spin motors of the gyroscopes, the switches and the torquers on the platform 10 are omitted in Figure 1, it being understood that any type of conventional lead arrangement, such as axial contacts or flexible leads, may be utilized to extend the wires between relatively movable parts of the gyroscope, such as the support members 13, 14 and the platform 10.

Platform 10 is supported through a gimbal structure which mounts the platform about a pair of mutually perpendicular displacement axes, the gimbal structure including a gimbal 60 having suitable bearing means therein (not shown) and receiving the pivots or shafts 61 and 62 attached to platform 10 to define one of the pivot or displacement axes of the platform. The shaft 61 also mounts rigidly therewith a rotor 63 of a precession motor 64 the field element of which is mounted on outer gimbal 60 and is not shown in the drawing since it is hidden from view. This erection motor or precession motor 64 is controlled by the operation of the switch 44, 45 operated by movement of the support 13 relative to the platform 10. It applies a torque to the platform about the axes defined by the pivots 61, 62 to cause precession of the support member 13 on the platform 10 to maintain a predetermined relationship between the support member and hence the gyroscope 11 and platform 10 in which the movable wiper 44 of the switch is not engaged with either of the contact members 45. Mounted on pivot 62 is a gear member 65 which is rigidly attached to the pivot, the gear member cooperating with a second gear of the same ratio and attached to a synchro or signal generating device 70 which is mounted on the gimbal 60 through a bracket 71. In the arrangement of the drawing, the synchro is merely offset from the pivotal axis of the inner gimbal for convenience herein but would normally be coincident with the axis of gimbal 10, and is operated by rotation of the platform 10 relative to the gimbal 60 about the pivots 61, 62. Gimbal 60 similarly includes pivots 70, 71 which cooperate with suitable bearing means (not shown) in a frame member 80 to define the second displacement axis of the platform 10. Mounted on pivot 71 is a rotor 72 of a precession motor 74, the field element 75 of which is mounted on the frame member 80 and cooperates with the rotor member 72 to apply a torque to the gimbal 60 about the axis of the pivots 70, 71 to cause precession of the gyroscope 12 and support 14 about its displacement axis on the platform 10. This precession motor is controlled by the switch 51, 52 which is operated by the support member 14. Shaft 70 like shaft 62 mounts a gear 81 which cooperates with a similar gear 82 attached to the output shaft of the synchro 90 mounted on a bracket 91 attached to the frame 80.

As pointed out above, the electrical connection between the various switching assemblies and motor components of the subject stabilized platform have been omitted in Figure 1 primarily for simplicity, it being understood that the mechanical interconnection of the wires between the relatively movable parts could be made either by flex-lead type of connection or by axial contact arrangements both of which are common in the art of gyroscopes.

The circuity for the stabilized platform is shown in Figure 4 in which the block 100 indicates schematically a terminal board or AN connector not shown in Figure 1. The solid connection lines leading from the terminal board indicate that wiring which would normally be placed on the gyroscope and which is omitted in Figure 1. Axial contact indications are omitted in the wiring diagram, it being understood that these connections would exist at the portions of the circuit indicated by the dotted lines between the relative movable and electrically interconnected parts to the platform. From Figure 4 it will be seen that the torquers 30, 31 which are mounted in part on the sensitive gimbal and in part on the platform or inner gimbal are energized from a direct current input signal which is variable in magnitude. A pair of potentiometers 101 and 102 shown in phantom in Figure 4 indicate that some means is available to vary this D. C. input to the torquers. It will also be evident as the disclosure proceeds that the measure of the rate of precession of the platform 10 or gyroscopes 11, 12 in space is proportional to the current or signal input to the torquers and hence meters 103 and 104 are shown in phantom in series with the variable source of power to these torquers to indicate a means for measuring this rate signal or giving an indication of the rate signal. It will be understood that the precession of the phantom 10 will be linear and uniform with respect to a theoretical pair of axes which extend through the platform 10 and are parallel respectively with the displacement axes of the sensitive gimbals. These axes will be coincident with the displacement axes of the supporting gimbal structure of the platform only when the platform is in geometric parallelism with the supporting structure. When the platform is displaced about one or the other of the displacement axes of the gimbal structure relative to the structure upon which the apparatus is mounted, the precession rate signals must be modified by the trigonometric relationships which exist between the platform and the associated apparatus or system, which are measured by the signalling devices 70 and 90. It will be understood from the drawings also that the torque applied to the gyroscopes 11, 12 through the support members 13, 14 is applied through the coil portion of the torquer and the arm attaching the same to the respective support member. The gyroscopes 11 and 12 or their respective spin motor field elements (only field element 21 of gyroscope 12 being shown in Figure 1) are energized from a three phase alternating current source. The rotors of the gyroscopes are arranged herein in a back to back relationship for compactness of design, it being necessary only that their spin axes be parallel and that they are connected and energized so they will rotate in contra-rotating directions for purposes which will be later noted. It will also be seen in Figure 1 that the pivot supports of sensitive gimbals 13, 14 are so positioned on platform 10 that the spin axes of the respective gyroscopes 11, 12 are aligned with one another when the gimbals 13, 14 are in a predetermined position with respect to platform 10, this position being that which the switching mechanisms associated with respective gimbals are not operative. In Figure 4 it will be seen that the erection motors 64, and 74 are energized from an alternating current source of power, the energization of these motors being controlled respectively by the switches 44, 45 and 51, 52. It will be understood, however, that other types of controllers may be employed to control these motors. The precession motors 64 and 74 are identical in structure, both having alternating current type field elements and hysteresis type rotors. It will be seen in the drawings that two sections of the windings of the respective precession motors are connected together each at a common point which is connected to the alternating current source of power. The windings have associated therewith a condenser 110 and 111, respectively for motors 64, 74 which is connected across the opposite extremities of the precession motor windings in an arrangement which permits the connection of the respective condenser, in series with one portion and the other portion of the winding for phase shifting purposes in a conventional manner. It will be seen also that the wiper 44 of the switch assembly associated with the rotor support or sensitive gimbal 13 (as per the broken line in Figure 4) is grounded as at 112 and cooperates with the stationary contacts 45 which are mounted on the platform 10 or inner gimbal. The stationary contacts are connected respectively through conductors 113, 114, to opposite extremities of condenser 110 and the extremities of the portions of the field element of the erection motor associated therewith. When moving contact 44 engages one or the other of the stationary contacts 45, one or the other portions of the field element of the precession motor 64 will be connected in series with the condenser and one in parallel with the same, and in series with the source of power. Similar arrangements will be found in connection wtih switching arrangement made up of a movable contact 51 and stationary contacts 52 associated with the erection motor or precession motor 74, the conductors 120, 121 connecting the contacts 52 with the uncommon extremities of the field windings and the terminals of condenser 111. This circuity provides in each precession or erection motor a reversal of torque depending upon which of the stationary contacts is engaged by the movable contact. It will be understood that other types of sensing devices and switching means can be used for energizing the erection motor other than the apparatus disclosed herein. Synchros 70 and 90 are shown in Figures 1 and 4 as being mounted on the outer gimbal and base respectively with their winding outputs being connected to the terminal board 100. The energizing windings of the synchros which are operatively connected respectively to the platform 10 and outer gimbal 60 to provide the relative movement between the parts making up the synchro are supplied with a single phase alternating current power.

*Operation*

The stabilized platform described above relies for its stability on the gyroscopic rigidity of the gyroscopes 11 and 12. The rotor mass driven by the spinning means of the gyroscopes is of such magnitude and is driven at such rotational velocity that it has a high angular momentum. The two gyroscopes are mounted on the platform 10 at right angles to one another or with their displacement axes normal to one another and in a normal position such that their spin axes are parallel or are aligned, in other words parallel to a common line. The wheels interact in such a manner that the operations of one wheel does not affect the other. It will be seen that the rotation of this platform about the axes defined by the pivots 61, 62 or the inner displacement axes of the platform will cause gyroscope 11 to rotate about the pivots for its support structure 13, this latter axis being normal to the axes 61, 62. At the same time, the application of torque about this axes 61, 62 does not affect the gyroscope 12 inasmuch as the torque is not applied to the support member 14 since that support member is journalled or pivoted on the platform 10 about an axis parallel to the axes 61, 62. The same thing is true in connection with the application of torque to the outer gimbal 60 about the axes defined by the pivots 70, 71, this torque resulting in precession of the gyroscope 12 about the axes of its support member 14 on platform 10. It will also be seen that when the rotors of the gyroscopes 11 and 12 are energized, the platform is rigid about the two axes and the displacement of the frame 80 with respect to either of the axes defined by the supports pivots 71, 70 and 61, 62 will not affect the position of the platform 10 in space, but that relative movement will occur between the respective gimbals and the frame to permit the gyroscopes to remain stationary in space. This relative movement between the platform or inner gimbal 10 and the outer gimbal 60 will be sensed by the synchro 70 and the movement between the outer gimbal 60 and the frame 80 will be sensed by the synchro 90. The output from these two synchros will measure displacement of the gimbals relative to one another and frame 80.

It should therefore be seen that the respective switching mechanisms which control the energization of the precession or erection motors 74 and 64 sense only precessions caused by frictional forces of the bearings and pivot structures of the gyroscopes or acceleration loads imposed on the gimbals by gyrations of the device upon which the apparatus is mounted, the main operation of the precession motors being to maintain the gyroscopes in a predetermined relationship with the platform 10 and with respect to one another. The spin axes of the gyroscopes are thus maintained parallel or aligned and hence their respective rotational inertias do not adversely affect one another and as will be later noted, the interaction of one gyroscope resulting from torque applied to the other gyroscope will perform a useful operation. The torquers 30, 31 connected with the gyroscopes 11 and 12 respectively are designed to apply a torque to the gyroscopes through the support member to which the torquer is connected, this torque producing a precession of the platform 10 about the axis supporting the platform which is normal to the axis about which the input torque is applied. As was pointed out above, the D. C. type torquer with limited displacement is used herein to provide for linearity between current input and torque output and the magnitudes of output of the torquers are such as to provide for wide ranges for precession of the platform 10. Inasmuch as the applied torque to the gyroscopes on platform 10 is directly proportional to the rate of precession of the platform 10, it follows that the current input to the torquers is directly related to the rates of precession of the platform 10 about one or the other of its displacement axes. Therefore in Figure 4 there is shown a potentiometer type of current regulating device and a meter in series with the D. C. input so that the rates of precession may be visually obtained from the meter and the rates of precession varied through the potentiometer. It will also be understood that this signal may be used for controlling purposes.

As pointed out above, the direction of rotation of the rotors of the gyroscopes 11, 12 are contra-rotating. The back torque or reaction torque to the operation of either of the torquers 30, 31 resulted in the application of a force to the gyroscope opposite to that which was directly affected by the application of direct torque from the torquer. The direct application of the torque, as previously noted, produced a precession of platform 10 about one of the displacement axes of the platform which was disposed 90 degrees to the axis of the gyroscope affected about which the input torque is applied. This axis about which the precession takes place is also parallel to the axis of the gyroscope not directly affected by the application of direct torque, and consequently the movement of the platform 10 in space would be such that the opposite gyroscope would tend to remain in its original position rather than being precessed with the gyroscope. However, by positioning the spin axes of the gyroscopes parallel to one another and the rotor contrarotating, it is provided that the reactive or back torque effect of this application to a direct torque will act upon the opposite gyroscope in such a manner that it causes precession of this gyroscope along with the precessive movement of the entire platform in such a manner that the gyroscopes tend to remain in the predetermined relationship with respect to one another and with respect to the platform. This operation will result in elimination of much of the work which would be required of the erection motors 64, 74 if this relationship was not maintained as precessing torques were applied to the platform. However in the event that the rotors are directed or spun in the same direction it will be realized that the back torque reaction resulting from the energization of one or the other of the torquers will be such so that it will not aid the operation of the opposite gyroscope. It will then be left to the switching device to sense displacement of the gyroscopes not affected by the precessing torque relative to the platform to energize the erection motor associated therewith and precess this gyroscope back into its predetermined relationship with the platform.

In considering this invention it should be kept in mind that the disclosure of the gyroscope is intended to be illustrative only and that changes may be made to the components making up the same without departing from the teaching of the invention. Therefore the scope of the invention should be determined only by the appending claims.

I claim as my invention:

1. A stabilizing device comprising, a platform adapted to be stabilized in space, a support for said platform, a gimbal structure mounting said platform on said support for displacement about a pair of mutually perpendicular axes and through relatively wide displacement angles relative to said support, a pair of identical high inertia gyroscope rotors, a pair of rotor mounting means each mounting one of said rotors for rotation about its spin axis and including a pivot structure normal to said spin axis for pivotally mounting said rotor mounting means on said platform for limited displacement relative thereto, said pair of rotor mounting means being so mounted on said platform that their respective displacement axes are normal to one another and each are disposed parallel with one or the other of said displacement axes of said gimbal structure, means for spinning each of said rotors mounted in part on said rotor mounting means and in part on said rotors, a direct current type of torquer for each rotor having a linear input to output torquer characteristics and each mounted in part on said platform and in part on said rotor mounting means and adapted to apply a torque to each rotor mounting means about its displacement axis, means mounted on said support for supplying said torquers with input signals from without said device to cause precession of said platform in space at rates proportional to the input signals, precessing means mounted in part on said platform and said gimbal structure and in part on said gimbal structure and said support for applying torques to said platform about said displacement axis of said gimbal structure to cause precession of said rotors and said rotor mounting means relative to said displacement axis of said rotor mounting means, means sensing displacement of said rotor mounting means relative to said platform for controlling respectively said precessing means to maintain each of said rotor mounting means in a predetermined position relative to said platform, and signal generating means associated with each of said displacement axes of said gimbal structure and adapted to produce a signal in proportion to displacement of said platform relative to said support about said displacement axes.

2. A stabilizing device comprising, a platform adapted to be stabilized in space, a support for said platform, a gimbal structure mounting said platform on said support for displacement about a pair of mutually perpendicular axes and through relatively wide displacement angles relative to said support, a pair of identical high inertia gyroscope rotors, a pair of rotor mounting means each mounting one of said rotors for rotation about its spin axis and including a pivot structure normal to said spin axis for pivotally mounting said rotor mounting means on said platform for limited displacement relative thereto, said pair of rotor mounting means being so mounted on said platform that their respective displacement axes are normal to one another and each are disposed parallel with one or the other of said displacement axes of said gimbal structure, means for spinning each of said rotors in a contra-rotating direction mounted in part on said rotor mounting means and part on said rotors, a direct current type of torquer for each rotor having a linear input to output torquer characteristics and each mounted in part on said platform and in part on said rotor mounting means and adapted to apply a torque to each rotor mounting means about its displacement axis, means mounted on said support for supplying said torquers with input signals from without said device to cause precession of said platform in space at rates proportional to the input signals, precessing means mounted in part on said platform and said gimbal structure and in part on said gimbal structure and said support for applying torques to said platform about said displacement axis of said gimbal structure to cause precession of said rotors and said rotor mounting means relative to said displacement axis of said rotor mounting means, means sensing displacement of said rotor mounting means relative to said platform for controlling respectively said precessing means to maintain each of said rotor mounting means in a predetermined position relative to said platform, and signal generating means associated with each of said displacement axes of said gimbal structure and adapted to produce a signal in proportion to displacement of said platform relative to said support about said displacement axes.

3. A stabilizing device comprising, a platform adapted to be stabilized in space, a support for said platform, a gimbal structure mounting said platform on said support for displacement about a pair of mutually perpendicular axes and through relatively wide displacement angles relative to said support, a pair of identical high inertia gyroscope rotors, a pair of rotor mounting means each mounting one of said rotors for rotation about its spin axis and including a pivot structure normal to said spin axis for pivotally mounting said rotor mounting means on said platform for limited displacement relative thereto, said pair of rotor mounting means being so mounted on said platform that their respective displacement axes are normal to one another and each are disposed parallel with one or the other of said displacement axes of said gimbal structure, means for spinning each of said rotors mounted in part on said rotor mounting means and in part on said rotors, a direct current type of torquer for each rotor having a linear input to output torquer characteristics and each mounted in part on said platform and in part on said rotor mounting means and adapted to apply a torque to each rotor mounting means about its displacement axis, means mounted on said support for supplying said torquers with input signals from without said device to cause precession of said platform in space at rates proportional to the input signals, precessing means mounted in part on said platform and said gimbal structure and in part on said gimbal structure and said support for applying torques to said platform about said displacement axis of said gimbal structure to cause precession of said rotors and said rotor mounting means relative to said displacement axis of said rotor mounting means, means sensing displacement of said rotor mounting means relative to said platform for controlling respectively said precessing means to maintain each of said rotor mounting means in a predetermined position relative to said platform, said spin axes of said rotors being parallel to a common line when said rotor mounting means are in said predetermined positions with respect to said platform, and signal generating means associated with each of said displacement axes of said gimbal structure and adapted to produce a signal in proportion to displacement of said platform relative to said support about said displacement axes.

4. A stabilizing device comprising, a platform adapted to be stabilized in space, a support for said platform, a gimbal structure mounting said platform on said support for displacement about a pair of mutually perpendicular axes and through relatively wide displacement angles relative to said support, a pair of identical high inertia gyroscope rotors, a pair of rotor mounting means each mounting one of said rotors for rotation about its spin axis and including a pivot structure normal to said spin axis for pivotally mounting said rotor mounting means on said platform for limited displacement relative thereto, said pair of rotor mounting means being so mounted on said platform that their respective displacement axes are normal to one another and each are disposed parallel with one or the other of said displacement axes of said gimbal structure, means for spinning each of said rotors mounted in part on said rotor mounting means and in part on said rotors, a direct current type of torquer for each rotor having a linear input to output torquer characteristics and each mounted in part on said platform and in part on said rotor mounting means and adapted to apply a torque to each rotor mounting means about its displacement axis, precessing means mounted in part on said platform and said gimbal structure and in part on said gimbal structure and said support for applying torques to said platform about said displacement axis of said gimbal structure to cause precession of said rotors and said rotor mounting means relative to said displacement axis of said rotor mounting means, means sensing displacement of said rotor mounting means relative to said platform for controlling respectively said precessing means to maintain each of said rotor mounting means in a predetermined position relative to said platform, said rotors having such mass and acceleration as to render said platform upon which they are mounted gyroscopically stable in space and such that said platform will precess about one or the other of said displacement axes of said gimbal structure at predetermined rates of acceleration when predetermined signals are supplied to one or the other of said torquers associated with one or the other of said gyroscope rotors, and signal generating means associated with each of said displacement axes of said gimbal structure and adapted to produce a signal in proportion to the displacement of said platform relative to said support about said displacement axes.

5. A stabilizing device comprising, a platform adapted to be stabilized in space, a support for said platform, a gimbal structure mounting said platform on said support for displacement about a pair of mutually perpendicular axes and through relatively wide displacement angles relative to said support, a pair of identical high inertia gyroscope rotors, a pair of rotor mounting means each mounting one of said rotors for rotation about its spin axis and including a pivot structure normal to said spin axis for pivotally mounting said rotor mounting means on said platform for limited displacement relative thereto, said pair of rotor mounting means being so mounted on said platform that their respective displacement axes are normal to one another and each are disposed parallel with one or the other of said displacement axes of said gimbal structure, means for spinning each of said rotors mounted in part on said rotor mounting means and in part on said rotors, a direct current type of torquer for each rotor having a linear input to output torquer characteristics and each mounted in part on said platform and in part on said rotor mounting means and adapted to apply a torque to each rotor mounting means about its displacement axis, precessing means mounted in part on said platform and said gimbal structure and in part on said gimbal structure and said support for applying torques to said platform about said displacement axis of said gimbal structure to cause precession of said rotors and said rotor mounting means relative to said displacement axis of said rotor mounting means, means sensing displacement of said rotor mounting means relative to said platform for controlling respectively said precessing means to maintain each of said rotor mounting means in a predetermined position relative to said platform, said rotors having such mass and acceleration as to render said platform gyroscopically stable in space and such that said platform will precess about one or the other of said displacement axes of said gimbal structures while said rotor mounting means remain in said predetermined positions relative to said platform at predetermined rates of acceleration when predetermined signals are supplied to one or the other of said torquers associated with one or the other of said rotors, and signal generating means associated with each of said displacement axes of said gimbal structure and adapted to produce a signal in proportion to the displacement of said platform relative to said support about said displacement axes.

6. A stabilizing device comprising, a platform adapted to be stabilized in space, a support for said platform, a gimbal structure mounting said platform on said support for displacement about a pair of mutually perpendicular axes and through relatively wide displacement angles relative to said support, a pair of identical high inertia gyroscope rotors, a pair of rotor mounting means each mounting one of said rotors for rotation about its spin axis and including a pivot structure normal to said spin axis for pivotally mounting said rotor mounting means on said platform for limited displacement relative thereto, said pair of rotor mounting means being so mounted on said platform that their respective displacement axes are normal to one another and each are disposed parallel with one or the other of said displacement axes of said gimbal structure, means for spinning each of said rotors in a contra-rotating direction mounted in part on said rotor mounting means and part on said rotors, a direct current type of torquer for each rotor having a linear input to output torquer characteristics and each mounted in part on said platform and in part on said rotor mounting means and adapted to apply a torque to each rotor mounting means about its displacement axis, precessing means mounted in part on said platform and said gimbal structure and in part on said gimbal structure and said support for applying torques to said platform about said displacement axis of said gimbal structure to cause precession of said rotors and said rotor mounting means relative to said displacement axis of said rotor mounting means, means sensing displacement of said rotor mounting means relative to said platform for controlling respectively said precessing means to maintain each of said rotor mounting means in a predetermined position relative to said platform, said spin axes of said rotors being aligned when said rotor mounting means are in said predetermined positions with respect to said platform, said rotors having such mass and acceleration as to render said platform gyroscopically stable in space and such that said platform will precess about one or the other of said displacement axes of said gimbal structures while said rotor mounting means remain in said predetermined positions relative to said platform at predetermined rates of acceleration when predetermined signals are supplied to one or the other of said torquers associated with one or the other of said rotors, and signal generating means associated with each of said displacement axes of said gimbal structure and adapted to produce a signal in proportion to displacement of said platform relative to said support about said displacement axes.

7. In a stabilized gyroscopic platform, a pair of contrarotating single axis displacement gyroscopes, a gimbal structure for mounting said gyroscopes including an inner gimbal pivotally mounted on an outer gimbal and a frame member pivotally mounting said outer gimbal, said pivotal mountings for said gimbal structure being positioned normal to one another and in a parallel relationship respectively with one or the other of said displacement axis of said gyroscopes, precessing motors mounted on said gimbal structure and associated with said pivotal mountings to apply torques to said gyroscopes on said inner gimbal, means mounted in part on said gyroscopes and in part on said inner gimbal sensing departure of said gyroscopes from a predetermined relationship with said inner gimbal to control the operation of said precessing motors and return said gyroscopes to said predetermined relationships with said inner gimbal, torque means mounted in part on each of said gyroscopes and energized from signals originating remote from said gimbal structure being operative to apply torques to said gyroscopes about their respective displacement axes to precess said inner gimbal about one or the other of said pivotal mountings of said gimbal structure at predetermined rates of precession depending upon the energization of said torque means, and means associated with said gimbal structure providing a signal in proportion to displacement of said inner gimbal relative to said frame member about both of said pivotal mountings of said gimbal structure.

8. In a stabilized gyroscopic platform, a pair of single axis small angle displacement gyroscopes, a gimbal structure for mounting said gyroscopes including an inner gimbal pivotally mounted on an outer gimbal and a frame member pivotally mounting said outer gimbal, said pivotal mountings for said gimbal structure being positioned normal to one another and permitting relatively wide displacement of said inner gimbal relative to said outer gimbal and said outer gimbal relative to said frame member, means mounting said gyroscopes on said inner gimbal with the displacement axes of said gyroscopes being positioned normal to one another and parallel respectively to one or the other of the pivotal mountings of said gimbal structure with the spin axes of said gyroscopes being parallel to a common line when the gyroscopes are in a predetermined relationship with said inner gimbal, precessing motors mounted on said gimbal structure and associated with said pivotal mountings to apply torques to said gyroscopes on said inner gimbal, means mounted in part on said gyroscopes and in part on said inner gimbal sensing departure of said gyroscopes from said predetermined relationship with said inner gimbal to control the operation of said precessing motors and return said gyroscopes to said predetermined relationship with said inner gimbal, torque means mounted in part on each of said gyroscopes and operative to apply a torque to one or the other of said gyroscopes about their respective displacement axes to precess said inner gimbal about one or the other of said pivotal mountings of said gimbal structure at predetermined rates of precession depending upon the energization of said torque means, and means mounted on said gimbal structure and responsive to displacement of said gimbal structure about its pivotal mountings for producing a signal in proportion to said displacements.

9. In a stabilized gyroscopic platform, a pair of single axis small angle displacement gyroscopes, a gimbal structure for mounting said gyroscopes including an inner gimbal pivotally mounted on an outer gimbal and a frame member pivotally mounting said outer gimbal, said pivotal mountings for said gimbal structure being positioned normal to one another and permitting relatively wide displacement of said inner gimbal relative to said outer gimbal and said outer gimbal relative to said frame, means mounting said gyroscopes on said inner gimbal with the displacement axes of said gyroscopes being positioned normal to one another and parallel respectively to one or the other of said pivotal mountings for said gimbal structure with the spin axes of said gyroscopes being aligned with one another when the gyroscopes are in a predetermined relationship with said inner gimbal, said gyroscopes having such high inertia when energized as to stabilize said inner gimbal in space such that displacement of said frame will not alter the position of said inner gimbal in space, precessing motors mounted on said gimbal structure and associated with said pivotal mountings to apply torques to said gyroscopes on said inner gimbal, means mounted in part on said gyroscopes and in part on said inner gimbal sensing departure of said gyroscopes from said predetermined relationship with said inner gimbal to control the operation of said precessing motors and return said gyroscopes to said predetermined relationship with said inner gimbal, torque means for said gyroscopes operative to precess said inner gimbal in space about one or the other of said pivotal mountings of said gimbal structures at rates proportional to the energization of said torque means, and means mounted on said gimbal structure and responsive to displacements of said gimbal structure about its pivotal mountings for producing a signal in proportion to said displacements.

10. In a stabilized gyroscopic platform, a pair of single axis small angle displacement gyroscopes, a gimbal structure for mounting said gyroscopes including an inner gimbal pivotally mounted on an outer gimbal and a frame member pivotally mounting said outer gimbal, said pivotal mountings for said gimbal structure being positioned normal to one another and permitting relatively wide displacement of said inner gimbal relative to said outer gimbal and said outer gimbal relative to said frame, means mounting said gyroscopes on said inner gimbal with the displacement axes of said gyroscopes being positioned normal to one another and parallel respectively to one or the other of the said pivotal mountings for said gimbal structure with the spin axes of said gyroscopes being aligned with one another when the gyroscopes are in a predetermined relationship with said inner gimbal, said gyroscopes having such high inertia when energized as to stabilize said inner gimbal in space such that displacement of said frame will not alter the position of said inner gimbal in space, precessing motors mounted on said gimbal structure and associated with said pivotal mountings to apply torques to said gyroscopes on said inner gimbal, means mounted in part on said gyroscopes and in part on said inner gimbal sensing departure of said gyroscopes from said predetermined relationship with said inner gimbal to control the operation of said precessing motors and return said gyroscopes to said predetermined relationship with said inner gimbal, torque means mounted in part on each of said gyroscopes and operative to apply a torque to one or the other of said gyroscopes about their respective displacement axes to precess said inner gimbal about one or the other of said pivotal mountings in said gimbal structure, the precession of said inner gimbal being at rates in proportion to the energization of said torque means, and means associated with said gimbal structure producing a signal in proportion to the displacement of said inner gimbal relative to said frame about both of said pivotal mountings of said gimbal structure.

11. In a stabilized gyroscopic platform, a pair of contra-rotating single axis displacement gyroscopes, a gimbal structure for mounting said gyroscopes including an inner gimbal pivotally mounted on an outer gimbal and a frame member pivotally mounting said outer gimbal, said pivotal mountings for said gimbal structure being positioned normal to one another, means mounting said gyroscopes on said inner gimbal with the displacement axes on said gyroscopes being positioned normal to one another and in parallel relationship respectively to one or the other of said pivotal mountings for said gimbal structure with the spin axes of said gyroscopes being aligned when said gyroscopes are in a predetermined relationship with said inner gimbal, said gyroscopes having such a high inertia when energized as to stabilize said inner gimbal in space such that displacement of said fame will not alter the position of said inner gimbal in space, precessing motors mounted on said gimbal structure associated with said pivotal mountings to apply torques to said gyroscopes on said inner gimbal, means sensing departure of said gyroscopes from said predetermined relationship with said inner gimbal to control the operation of said precessing motors and return said gyroscopes to said predetermined relationship with said inner gimbal, torque means operative to apply a torque to one or the other of said gyroscopes about their respective displacement axes to precess said gimbal structure with said gyroscopes thereon about said pivotal mountings of said gimbal structure such that said spin axes of said gyroscopes remain aligned with one another and said spin axes of said gyroscopes are moved in space at predetermined rates of precession in direct proportion to the energization of said torque means, and means associated with said gimbal structure and responsive to the displacement of said gimbal structure about said pivotal mounting for producing a signal in proportion to said displacements.

12. In a stabilizing device, at platform, a pair of stabilizing gyroscopes each mounted on said platform through a single axis gimbal structure and said gyroscopes having their spin axes normally parallel to a common line when said gyroscopes are in a predetermined position on said platform, a gimbal structure pivotally mounting said platform about a pair of mutually perpendicular displacement axes, means responsive to a departure of said gyroscopes from said predetermined position on said platform for precessing said gyroscopes back into said predetermined position on said platform, means for applying torques including a signal input independent of platform position in space to said gyroscopes to precess said platform at rates proportional to the magnitude of the signal input about one or the other of said displacement axes, and means for producing a signal in response to displacement of said platform about said displacement axes.

13. In a stabilizing device, a platform, a pair of stabilizing gyroscopes each mounted on said platform through a single axis pivot structure and said gyroscopes having their spin axes normally aligned when said gyroscopes are in a predetermined position on said platform, a gimbal structure pivotally mounting said platform about a pair of mutually perpendicular displacement axes, means responsive to a departure of said gyroscopes from said predetermined position on said platform precessing said gyroscopes back into said predetermined position on said platform, means for applying torques to said gyroscopes in proportion to input signals which are independent of predetermined reference positions to precess said platform such that said spin axes of said gyroscopes are displaced in space at rates directly proportional to the applied torques to said gyroscope about one or the other of said displacement axes, and means for producing a signal in response to displacement of said platform about said displacement axes.

14. In a stabilizing device, a platform, a pair of contra-rotating stabilizing gyroscopes each mounted on said platform through a single axis pivot structure and said gyroscope having their spin axes normally aligned when said gynoscopes are in a predetermined position on said platform, a gimbal structure pivotally mounting said platform about a pair of mutually perpendicular displacement axes, means responsive to a departure of said gyroscopes from said predetermined position on said platform precessing said gyroscopes back into said predetermined position on said platform, means for applying torques to said gyroscopes in proportion to input signals supplied remote from the device to precess said platform such that said spin axes of said gyroscopes are displaced in space at rates directly proportional to the applied torques to said gyroscope about one or the other of said displacement axes, and means for producing a signal in response to displacement of said platform about said displacement axes.

References Cited in the file of this patent

UNITED STATES PATENTS

| | | |
|---|---|---|
| 1,446,348 | Hort | Feb. 20, 1923 |
| 1,947,562 | Marmonier | Feb. 20, 1934 |
| 2,008,058 | Boykow | July 16, 1935 |
| 2,591,697 | Hays, Jr. | Aug. 8, 1952 |